June 16, 1964     W. A. WESTLING     3,137,855
AIRCRAFT WARNING SYSTEM
Filed June 22, 1961
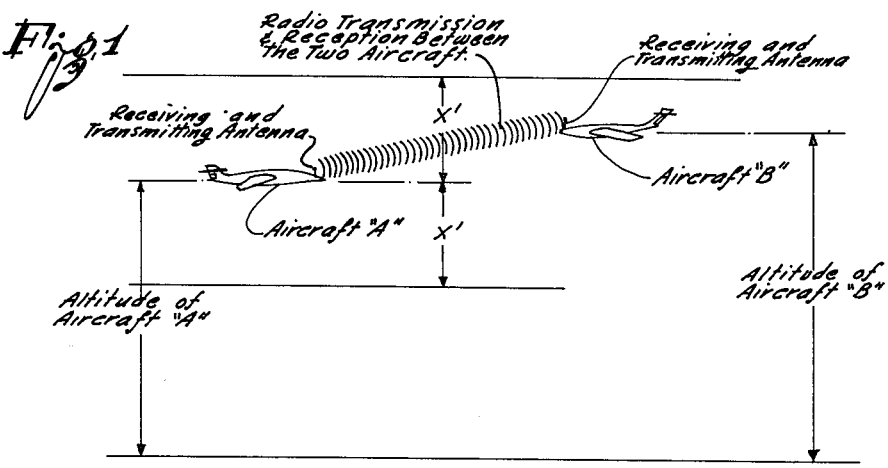
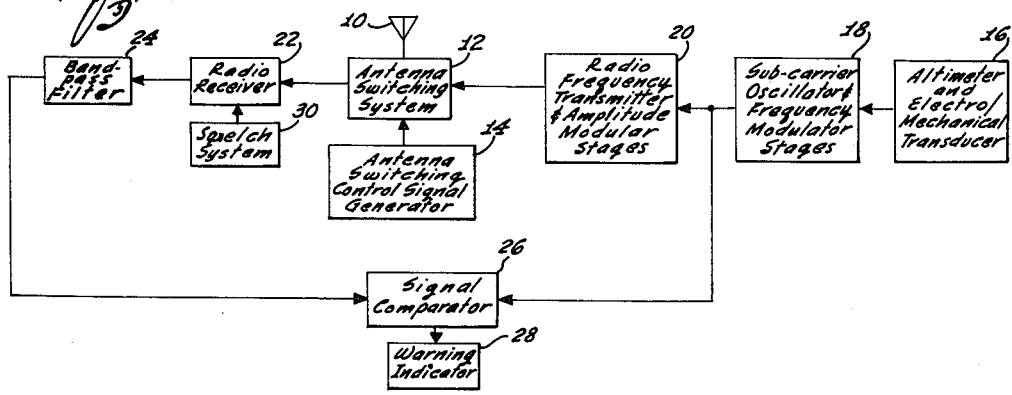
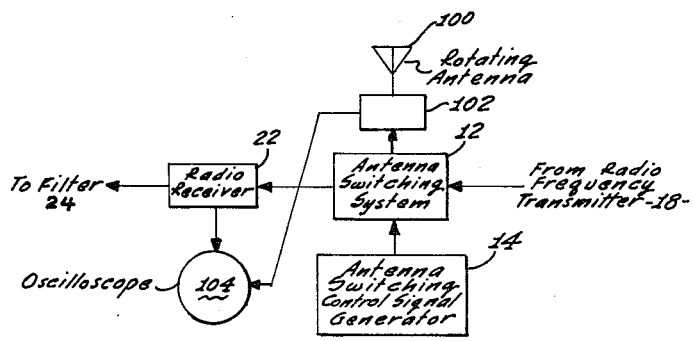
INVENTOR.
Wayne A. Westling
By Keith D. Beecher
Attorney

United States Patent Office 3,137,855
Patented June 16, 1964

3,137,855
AIRCRAFT WARNING SYSTEM
Wayne A. Westling, 794 27th St.,
Manhattan Beach, Calif.
Filed June 22, 1961, Ser. No. 118,960
8 Claims. (Cl. 343—112)

The present invention relates to aircraft warning systems, and it relates more particularly to aircraft warning systems for use in the aircraft and to warn the pilots of the aircraft of the presence of other aircraft within a predetermined field of surveillance.

The present tendency toward higher and higher speed aircraft, and the increase in aircraft traffic, has created a pressing need for effective warning systems to apprise pilots of the presence of another aircraft within a predetermined range of their particular aircraft.

Many attempts have been made in the past to provide warning systems which have the capabilities of being sensitive, rapid, accurate and reliable in their operation; and yet of being light in weight and compact in size so as to render them practical for airborne operations. However, for the most part, the prior art attempts have failed to produce a practical warning system which answers all the criteria outlined above.

It is an object of the present invention to provide an improved airborne anti-collision aircraft warning system for use in aircraft which is practical in all respects to indicate the proximity of another aircraft at approximately the same altitude.

The system of the present invention in the embodiment to be described uses radio transmission and reception to achieve its desired result, and the system is therefore extremely simple to operate, and it may be designed to have any desired range sensitivity.

Another object of the invention is to provide such an improved anti-collision aircraft warning system which is extremely accurate and reliable in its operation, and which functions immediately to indicate the presence of another similarly equipped aircraft within a predetermined altitude with respect to the altitude of the first aircraft.

Yet another object of the invention is to provide such an improved anti-collision aircraft warning system which may be constructed as a relatively compact and lightweight unit and which is eminently suited for installation in an aircraft.

A still further object of the invention is to provide such an improved system which utilizes readily available known components, and which requires relatively few stages and components so as to be relatively inexpensive to construct.

The features of the invention which are believed to be new are set forth in the attached claims. Other objects and advantages of the invention, however, may best be understood by reference to the following description when taken in conjunction with the accompanying drawing, in which:

FIGURE 1 is a schematic pictorial representation of the manner in which the presence of a second aircraft is detected by a first aircraft, and vice versa, when both aircraft are equipped with a warning system constructed in accordance with the concepts of the present invention;

FIGURE 2 is a block diagram of one embodiment of the invention; and

FIGURE 3 is a fragmentary block diagram illustrating the manner in which the embodiment of FIGURE 2 may be modified to exhibit direction indicating capabilities.

As illustrated pictorially in FIGURE 1, an aircraft A and an aircraft B are both assumed to be equipped with a warning system constructed in accordance with the present invention.

The aircraft A is shown to be moving to the right in FIGURE 1 at a selected altitude. The warning system mounted in the aircraft A includes a receiver which responds to a transmitted signal from a transmitter in the aircraft B. The frequency of a modulation component of the transmitted signal from the aircraft B is caused to vary as a function of the altitude of the aircraft B.

The warning system in the aircraft A also generates a local alternating current signal whose frequency varies as a function of the altitude of the aircraft A. The warning system in the aircraft A also includes a receiver which detects the modulation component in the signal received from the aircraft B, and the warning system in the aircraft A also includes a signal comparator coupled to the receiver. The signal comparator responds to the detected modulation component of the signal from the aircraft B, and to the alternating current signal generated in the aircraft A, to produce an output signal when the frequency of these two signals falls within a predetermined frequency range with respect to one another.

A suitable audible or visual indicator is coupled to the signal comparator to respond to the output signal to apprise the pilot in the aircraft A of the proximity of the aircraft B. The aircraft B is similarly equipped, and its pilot is apprised in like manner of the proximity of the aircraft A.

In the manner described briefly above, the output signal from the signal comparator is produced by the warning system in the aircraft A when the aircraft B is within X feet above or below the aircraft A. This signal can be used, as indicated above, to sound an alarm, such as a buzzer or a warning light, to indicate that another aircraft has come within the field of surveillance of the aircraft A.

As also mentioned above, the like warning system in the aircraft B may operate in exactly the same manner to inform the pilot of the aircraft B of the presence of the aircraft A within a predetermined altitude range with respect to the altitude of the aircraft B.

The warning system of the invention can be made sensitive to any desired azimuth range merely by the appropriate design of the transmitter power and receiver sensitivity. Likewise, the directional or omni-directional properties of the system can be designed to any desired antenna radiation pattern by the appropriate design of the respective antenna systems. In addition, the altitude range of responsiveness of the system can be predetermined to any desired value. For example, in one particular application, a system range of 5 miles with omni-directional characteristics has been provided, and an altitude response of $X = \pm 250$ feet has been incorporated.

The embodiment of the invention shown in FIGURE 2 includes an antenna 10. The antenna 10 is assumed to have omni-directional characteristics. However, the antenna may have any desired directional characteristics, extending for example, fore and aft with respect to the aircraft. The antenna 10 is coupled to an antenna switching system 12, which is controlled by an antenna switching control signal generator 14. The antenna switching system causes the antenna to be switched alternately to the receiving and transmitting portions of the system of FIGURE 2 on a time-shared basis. Appropriate means are provided to disable the receiving portion of the system when the antenna is switched to the transmitting portion, and vice versa, to prevent paralysis of the receiving portion by the transmitting portion of the system. This switching proceeds at a rate determined by the signal generated by the generator 14.

It should be pointed out at this point that the various units which make up the warning system of the present invention are, in themselves, extremely well known and are available as "shelf items." For that reason, it is believed unnecessary to describe these units and components in detail, or to encumber the present specification with circuit diagrams and circuit descriptions of the individual units.

The system of FIGURE 2 also includes an altimeter and electro-mechanical transducer 16. The unit 16 functions in well known manner to develop an output signal whose amplitude is proportional to the altitude of the aircraft. The output signal from the unit 16 is introduced to a sub-carrier oscillator and frequency modulator 18. The sub-carrier oscillator 18 generates a sub-carrier signal which is frequency modulated by the output signal from the unit 16. The frequency of the sub-carrier signal, therefore, is a function of the altitude of the aircraft in which the equipment of FIGURE 2 is installed.

The frequency modulated sub-carrier signal from the sub-carrier oscillator 18 is applied to a radio frequency transmitter and modulator 20. The sub-carrier from the unit 18 is amplitude modulated in the unit 20 on a radio frequency carrier generated in the latter unit, and the resulting modulated radio frequency carrier is fed to the antenna 10 on a time-shared basis by the switching system 12.

The above described transmitting portion of the system of FIGURE 2 radiates a radio signal which includes a sub-carrier as a modulation component, the frequency of the sub-carrier being an indication of the altitude of the aircraft in which the equipment is installed.

Should the transmitting portion of a like system in another aircraft radiate such a radio signal, the signal will be received by the antenna 10. The antenna switching system 12 causes the received signal to be introduced to a radio receiver 22 on a time-shared basis with the transmitting portion of the system. The radio receiver 22 may be of the transponder type, and it detects the received signal and produces an output signal corresponding to the frequency modulated sub-carrier developed in the other aircraft. It will be appreciated that the frequency of the signal produced by the receiver 22 is a function of the altitude of the other aircraft.

The signal produced by the receiver 22 is passed through a band-pass filter 24 to a signal comparator 26. The locally generated sub-carrier from the unit 18 is also applied to the signal comparator 26.

The signal comparator 26 may have the form of a heterodyne mixer, and when the frequency of the sub-carrier signal passed by the band-pass filter 24 approaches within a particular range of the frequency of the locally generated sub-carrier, the comparator 26 develops an output signal. This output signal activates a warning indicator 28 which may, as noted above, be of any suitable audible or visual type, or both.

A usual squelch system 30 may be coupled to the receiver 22. This squelch system operates in known manner to silence the receiver until another aircraft enters the field of surveillance of the aircraft in which the system of FIGURE 2 is installed. While the system is in operation, the transmitting portion operates continuously as a beacon to apprise other similarly equipped aircraft of the presence of the aircraft in which the system of FIGURE 2 is installed.

It is evident that the appropriate design of the signal comparator 26 will determine the altitude range of sensitivity of the system to the presence of other aircraft. The over-all accuracy of the system is a function of the stability of the sub-carrier oscillator 18, and of the altimeter and tranducer 16.

It is evident that all aircraft of a particular class, or classes, must be equipped with the system of FIGURE 2, or similar systems, in order that the system in any particular aircraft is to be effective.

In brief, therefore, the system of the invention, as embodied in FIGURE 2, includes a transmitting portion and receiving portion mounted in a first aircraft, these portions operating alternately and time-sharing a common antenna system. The modulated radio frequency carrier is radiated by the system of FIGURE 2, the carrier including a sub-carrier as a modulation component which, in turn, is frequency modulated as a function of the altitude of the aircraft. As noted above, the radiation pattern from the antenna may be omni-directional or it may have any desired directional characteristics.

The radio frequency carrier radiated by the first aircraft is received by all other similarly equipped aircraft in the predetermined field of surveillance, and if any of the other aircraft come within a predeterimned altitude range with respect to the first aircraft, suitable alarms are sounded instantaneously in all the affected aircraft.

The system of FIGURE 2 is not capable of indicating the direction of other aircraft which come within the field of surveillance of the first aircraft. The system of FIGURE 2 merely alerts the pilot of the first aircraft when another aircraft is within his predetermined area of surveillance, and radiates a warning signal to the pilot of the other aircraft. The system may be modified, however, to include direction indicating equipment. Such a modification is shown in the partial block diagram of FIGURE 3. The system of FIGURE 3 is similar to that of FIGURE 2, and the unmodified stages have not been shown in FIGURE 3.

In FIGURE 3, the omni-directional antenna 10 of FIGURE 2 is replaced by a rotating antenna 100 having directional characteristics. As the antenna 100 is rotated, it sweeps in an azimuth direction around 360 degrees with respect to the aircraft on which it is mounted. The antenna 100 may be constructed in any known manner, and it is driven by a usual drive system 102. The drive system 102 not only causes the antenna 100 to rotate, but it also develops signals which indicate the instantaneous angular orientation of the antenna. A cathode-ray oscilloscope 104 is coupled to the receiver 22.

The drive system 102 develops, as mentioned above, sweep signals for the oscilloscope 104. These sweep signals cause the cathode-ray beam in the oscilloscope 104 to produce a circular trace on the display screen in synchonism with the rotation of the antenna 100. The cathode-ray beam in the oscilloscope is modulated by the received signals, and the points of maximum illumination of the trace indicate the actual direction of the other aircraft from the aircraft in which the system is installed.

The invention provides, therefore, a new and improved aircraft warning system which may be inexpensively constructed, and which requires a minimum of components. Moreover, the components required by the system of the invention are readily available on the commercial market.

The system of the invention is light and compact, yet it is extremely accurate and reliable in its operation.

As described above, the system may be designed to have any desired azimuth range of influence and to detect the presence of aircraft within any desired altitude range from the aircraft in which the equipment is installed.

Moreover, suitable known means may be provided for voice communication between the aircraft, for example, by amplitude modulation of the radiated sub-carriers.

As described above, the system of the invention may function in conjunction with an omni-directional antenna means, or it may be used in conjunction with a rotating directional antenna to provide direction information of intercepted aircraft.

Therefore, while particular embodiments of the invention have been shown and described, it is evident that modifications may be made. The attached claims are intended to cover all such modifications as fall within the spirit and scope of the invention.

I claim:

1. An aircraft warning system for use in an aircraft including: first circuit means for developing a first signal having a characteristic varying as a function of the altitude of the aircraft, second circuit means for receiving a second signal from a distant aircraft having a characteristic varying as a function of the altitude of the distant aircraft, control circuitry means for repeatedly activating said first circuit means and disabling said second circuit means, and for alternately repeatedly disabling said first circuit means and activating said second circuit means, and coupled to said first circuit means for producing a warning signal when said first and second signals have a predetermined relationship.

2. An aircraft warning system for use in an aircraft including: first circuit means for developing a first signal having a characteristic varying as a function of the altitude of the aircraft, second circuit means for receiving a second signal from a distant aircraft having a characteristic varying as a function of the altitude of the distant aircraft, control circuitry for repeatedly activating said first circuit means and disabling said second circuit means, and for alternately repeatedly disabling said first circuit means and activating said second circuit means, and signal comparator means coupled to said first and second circuit means for producing a warning signal when said first and second signals have a predetermined relationship.

3. An aircraft warning system for use in an aircraft including: first circuit means for developing a first signal having a frequency varying as a function of the altitude of the aircraft, second circuit means for receiving a second signal from a distant aircraft having a frequency varying as a function of the altitude of the distant aircraft, control circuitry for repeatedly activating said first circuit means and disabling said second circuit means, and for alternately repeatedly disabling said first circuit means and activating said second circuit means, and signal comparator circuit means coupled to said first and second circuit means for producing a warning signal when the frequency of the second signal comes within a predetermined range of the frequency of said first signal.

4. An aircraft warning system for use in an aircraft including: altitude responsive means for developing a signal having a characteristic varying as a function of the altitude of the aircraft, circuit means coupled to said altitude responsive means for producing an alternating current signal and for modulating said alternating current signal in accordance with the signal from said altitude responsive means, receiver means, antenna means, switching circuitry coupled to said antenna means and adapted to couple said antenna means selectively to said circuit means for radiating the modulated alternating current signal and to said receiver means for causing said receiver means to receive a like modulated signal from a distant aircraft, control circuitry coupled to said switching circuitry for repeatedly causing said switching circuitry to selectively couple said antenna means to said circuit means and to said receiver means, signal comparator means coupled to said receiver means and to said circuit means for producing an output signal when the signal from the receiver means has a predetermined relationship with the modulated signal from said circuit means, and indicator means coupled to said signal comparator means to be activated by said output signal produced by said signal comparator means.

5. An aircraft warning system for use in an aircraft including: altitude responsive means for developing a signal having an amplitude varying as a function of the altitude of the aircraft, circuit means coupled to said altitude responsive means for producing an alternating current signal and for frequency modulating the alternating current signal in accordance with the signal from said altitude responsive means, receiver means, antenna means, switching circuitry coupled to said antenna means and adapted to couple said antenna means selectively to said circuit means for radiating the frequency modulated signal and to said receiver means for causing said receiver means to receive a like frequency modulated signal from a distant aircraft, control circuitry coupled to said switching circuitry for repeatedly causing said switching circuitry to selectively couple said antenna means to said circuit means and to said receiver means, signal comparator means coupled to said receiver means and to said circuit means for providing an output signal when the frequency of the signal from the receiver means comes within a predetermined range of the frequency of the frequency modulated signal from said circuit means, and indicator means coupled to said signal comparator means to be activated by the output signal produced by said signal comparator means.

6. An aircraft warning system for use in an aircraft including: altitude responsive means for developing a signal having an amplitude varying as a function of the altitude of the aircraft, circuit means for producing a sub-carrier signal and coupled to said altitude responsive means for frequency modulating the sub-carrier in accordance with the signal from said altitude responsive means, radio frequency transmitter means for producing a radio frequency carrier signal and coupled to said circuit means for modulating the radio frequency carrier in accordance with the frequency modulated sub-carrier, receiver means, antenna means, switching circuitry coupled to said antenna means and adapted to couple said antenna means selectively to said transmitter means for radiating the modulated carrier signal and to said receiver means to cause said receiver means to receive a like frequency modulated signal from a distant aircraft, control circuitry coupled to said switching circuitry for repeatedly causing said switching circuitry to selectively couple said antenna means to said transmitter means and to said receiver means, signal comparator means coupled to said receiver means and to said circuit means for producing an output signal when the frequency of the signal from the receiver means comes within a predetermined range of the frequency of the sub-carrier from said circuit means, and indicator means coupled to said signal comparator means to be activated by said output signal produced thereby.

7. The system defined in claim 5 and which includes a squelch system coupled to said receiver means for muting said receiver means in the absence of the reception of a like frequency modulated signal by said antenna means.

8. The system defined in claim 5 and in which said antenna means includes a rotatable antenna and an antenna drive system coupled thereto for imparting rotational motion to said antenna and for developing signals representative of the angular orientation of said antenna, and which includes cathode ray display means coupled to said receiver means and to said antenna drive system for providing a visual display of the direction of the distant aircraft upon the receipt by said antenna means of a like frequency modulated signal therefrom.

References Cited in the file of this patent

UNITED STATES PATENTS

| | | |
|---|---|---|
| 2,157,122 | Dunmore | May 9, 1939 |
| 2,252,083 | Luck | Aug. 12, 1941 |
| 2,378,604 | Wallace | June 19, 1945 |
| 2,403,603 | Korn | July 9, 1946 |
| 2,498,933 | Wallace | Feb. 28, 1950 |
| 2,568,568 | Stansbury | Sept. 18, 1951 |
| 2,585,605 | Wallace | Feb. 12, 1952 |
| 3,007,152 | Simmons | Oct. 31, 1961 |